US007043573B2

(12) United States Patent
Ito

(10) Patent No.: US 7,043,573 B2
(45) Date of Patent: May 9, 2006

(54) METHOD OF IMPROVING STABILITY AND COMMUNICATION EFFICIENCY OF IRDA COMMUNICATION BETWEEN HOST DEVICE AND PERIPHERAL DEVICE

(75) Inventor: Hiroyasu Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 09/948,595

(22) Filed: Sep. 10, 2001

(65) Prior Publication Data

US 2002/0032812 A1    Mar. 14, 2002

(30) Foreign Application Priority Data

Sep. 14, 2000  (JP)  .............................. 2000-280049

(51) Int. Cl.
G06F 13/00  (2006.01)
H04B 10/24  (2006.01)
H04L 29/06  (2006.01)

(52) U.S. Cl. .............................. 710/17; 710/8; 710/18; 710/105

(58) Field of Classification Search .................... 710/8, 710/62–64, 72, 104–106; 370/448; 455/557; 709/227, 228
See application file for complete search history.

(56) References Cited

U.S. PATENT DOCUMENTS

| 5,736,984 A | * | 4/1998 | Jellinek et al. ............. 715/710 |
| 5,818,821 A | * | 10/1998 | Schurig ...................... 370/293 |
| 5,966,375 A | | 10/1999 | Kagaya ...................... 370/338 |
| 6,195,712 B1 | * | 2/2001 | Pawlowski et al. ........... 710/19 |
| 6,379,058 B1 | * | 4/2002 | Petteruti et al. .............. 400/76 |

OTHER PUBLICATIONS

IrDA Control Specification (Formerly IrBus) IrDA CIR (Control IR) Standard, Final Specification, Final Revision 1.0, Jun. 30, 1998.*

* cited by examiner

*Primary Examiner*—Ilwoo Park
(74) *Attorney, Agent, or Firm*—Fitzpatrick, Cella, Harper & Scinto

(57) ABSTRACT

An IrDA control method enabling communication by an optimum procedure without command collision even in an environment where plural host devices and plural peripheral devices exist. The plural host devices respectively have a unique back-off value, and the plural peripheral devices respectively have a unique back-off value. The respective devices perform an Enumeration procedure and a Bind procedure in accordance with the back-off value. Especially when another device is currently performing a series of Enumeration processing, transmission of response command is inhibited. Accordingly, command collision can be avoided, and as a result, communication efficiency and communication stability can be improved.

27 Claims, 15 Drawing Sheets

F I G. 10
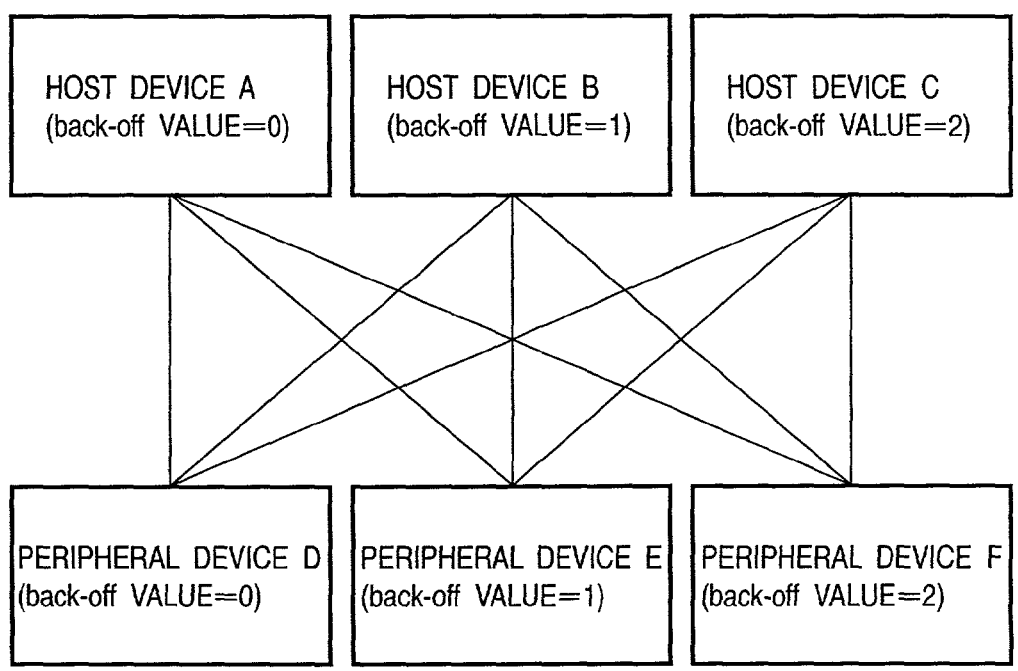

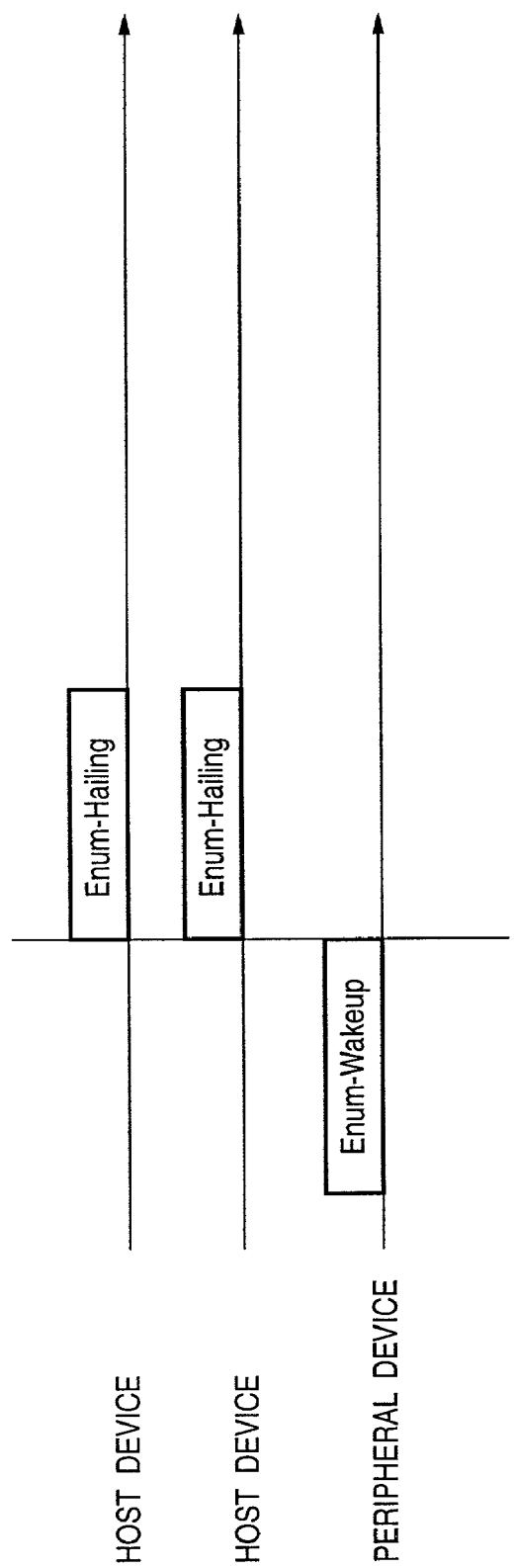

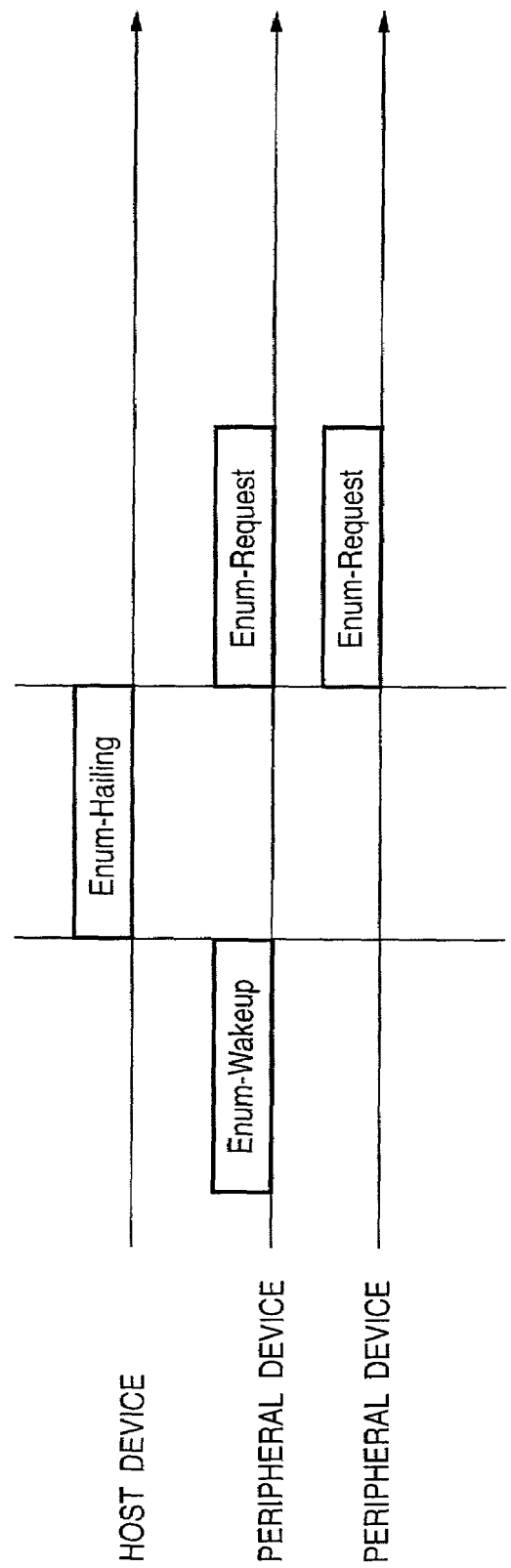

METHOD OF IMPROVING STABILITY AND COMMUNICATION EFFICIENCY OF IRDA COMMUNICATION BETWEEN HOST DEVICE AND PERIPHERAL DEVICE

BACKGROUND OF THE INVENTION

The present invention generally relates to a communication technique conforming to the IrDA (Infrared Data Association) standards as an infrared bidirectional wireless communication standard, and more particularly, to a method of improving communication efficiency in simultaneous communication between plural host devices and plural peripheral devices.

Conventionally, the "IrDA Control Method" (IrDA Control Specification, Final Revision 1.0, Jun. 30, 1998) is known as an infrared wireless communication method. As the IrDA control method is an infrared communication method enabling bidirectional communication, a product using a remote control unit conforming to IrDA-control to download an electronic program guide from a set top box and operate the guide and the like have been proposed.

Further, in the IrDA control method, as up to 8 devices can be connected, a product where one game machine is connected to plural game pads to allow plural players to join a game and the like have been proposed.

FIG. 12 is a block diagram showing the construction of the conventional IrDA control apparatus, and FIGS. 13 to 15, timing charts of Enumeration procedure in the conventional IrDA control apparatus.

Note that "Enumeration" means a procedure to register a peripheral device, which is to communicate with a host device, in the host device.

As shown in FIG. 12, the conventional IrDA control apparatus has at least a pair of host device 21 and peripheral device 22. The host device 21 has a host IrDA control signal transmission/reception unit 23 and a host communication control unit 24, and the peripheral device 22 has a peripheral device IrDA control signal transmission/reception unit 25, a peripheral device communication control unit 26 and an operation unit 27.

The host device 21 and the peripheral device 22 are connected with each other by IrDA control signals via the host IrDA control signal transmission/reception unit 23 and the peripheral device IrDA control signal transmission/reception unit 25. The host communication control unit 24 controls communication in the host device 21, and the peripheral device communication control unit 26 controls communication in the peripheral device 22. The operation unit 27 is operated by an operator to control the host device 21.

The host device 21 and the peripheral device 22 perform Enumeration so as to recognize the respective devices. The Enumeration is started by operation at the operation unit 27 of the peripheral device 22 by the operator, and as shown in FIG. 13, the peripheral device 22 transmits an Enumeration request, Enum-Wakeup, then the host device 21 receives the Enum-Wakeup, and transmits Enum-Hailing. Then the peripheral device 22 receives the Enum-Hailing, and transmits Enum-Request. In response to the request, the host device 21 transmits Enum-Response. By this procedure, the host device 21 transmits its unique information to the peripheral device 22 that has transmitted the Enum-Wakeup, thereby registers the peripheral device 22 in preparation for communication.

However, as the Enum-Wakeup transmitted by the peripheral device lacks information to designate the host device, if plural host devices exist, as shown in FIG. 14, the plural host devices simultaneously transmit the Enum-Hailing in response to the Enum-Wakeup, which causes command collision and disturbs communication.

Further, as the Enum-Hailing transmitted by the host device also lacks information to designate the peripheral device, if plural peripheral devices exist, as shown in FIG. 15, the plural peripheral devices simultaneously transmit the Enum-Request in response to the Enum-Hailing, which causes command collision and disturbs communication.

Further, when the Enumeration has been completed, a Bind procedure is performed upon start of data communication. To perform actual communication with the IrDA control peripheral device that has completed the Enumeration, the host device receives unique information of the peripheral device. In the Bind procedure, as Bind-Hailing transmitted by the host device 21 lacks information to designate the peripheral device, if plural peripheral devices exist, the plural peripheral devices simultaneously transmit Bind-Request in response to the Bind-Hailing, which causes command collision and disturbs communication, as in the case of the Enumeration.

To solve the problems, the IrDA Control Specification (Final Revision 1.0, Jun. 30, 1998) has a description of avoiding command collision by plural peripheral devices, if exist in the system and simultaneously respond to a command from the host device, by respectively generating a back-off value from "0" to "7" at random, and ignoring a command frame from the host device by a number corresponding to the back-off value to shift command transmission timing.

Further, the above specification also has a description of Dithering to avoid command collision by plural host devices, if exist in the system and simultaneously respond to a command from the peripheral device, by respectively generating waiting time from 0 msec to 12 msec at random, and delaying command transmission by the waiting time, thus shifting command transmission timing.

However, in the collision avoiding methods described in the above specification, the possibility of command collision is uncertain before command collision actually occurs.

Further, as the command transmission timing is shifted by values generated at random, the command collision cannot be always avoided by an optimum procedure.

Further, if plural host devices and plural peripheral devices exist, it is necessary to first avoid collision of commands transmitted by the host devices by the Dithering, then to find timing avoiding collision by using back-off values generated at random by the respective peripheral devices with respect to the commands from the respective host devices. In this procedure, much time is required to establish communication between the host devices and the peripheral devices, and further, time to complete the procedure cannot be defined.

SUMMARY OF THE INVENTION

The present invention has been made in consideration of the above situation, and has its object to realize communication by an optimum procedure, without command collision, even between plural host devices and plural peripheral devices.

According to the present invention, the foregoing object is attained by providing an infrared bidirectional communication system including one or more host devices and one or more peripheral devices, wherein the host device comprising: host back-off value setting means for setting a back-off value of the host device; determination means for determining timing of transmission of a response command to a command, where a destination host device is not designated, received from the peripheral device, based on the back-off value set by the host back-off value setting means; and inhibition means for inhibiting transmission of the response command if another device is currently performing a series of Enumeration processing, and wherein the peripheral device comprising: peripheral device back-off value setting means for setting a back-off value of the peripheral device; determination means for determining timing of transmission of a response command to a command, where a destination peripheral device is not designated, received from the host device, based on the back-off value set by the peripheral device back-off value setting means; and inhibition means for inhibiting transmission of the response command if another device is currently performing the series of Enumeration processing.

Further, according to the present invention, the foregoing object is attained by providing an IrDA control method for controlling infrared bidirectional communication performed between a host device and a peripheral device, wherein on the host device side, the method comprising: a host back-off value setting step of setting a back-off value of the host device; a determination step of determining timing of transmission of a response command to a command, where a destination host device is not designated, received from the peripheral device, based on the back-off value set at the host back-off value setting step; and a inhibition step of inhibiting transmission of the response command if another device is currently performing a series of Enumeration processing, and wherein on the peripheral device side, the method comprising: a peripheral device back-off value setting step of setting a back-off value of the peripheral device; a determination step of determining timing of transmission of a response command to a command, where a destination peripheral device is not designated, received from the host device, based on the back-off value set at the peripheral device back-off value setting step; and an inhibition step of inhibiting transmission of the response command if another device is currently performing the series of Enumeration processing.

In accordance with the present invention as described above, if plural host devices and plural peripheral devices exist, the plural host devices respectively have a unique back-off value, and the plural peripheral devices respectively have a unique back-off value. The respective devices perform the Enumeration procedure and the Bind procedure in accordance with the back-off value, and especially when another device is performing the series of Enumeration processing, inhibit the transmission of response command.

The present invention is particularly advantageous since even in an environment where plural host devices and plural peripheral devices exist, command collision can be prevented, and communication can be performed by an more appropriate procedure. As a result, the communication efficiency and stability can be improved in IrDA communication between a host device and a peripheral device respectively having an IrDA interface.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a block diagram showing connection by IrDA control signals between three host devices and three peripheral devices;

FIG. 14 is a timing chart showing another example of the Enumeration procedure by the conventional IrDA control apparatus; and FIG. 15 is a timing chart showing another example of the Enumeration procedure by the conventional IrDA control apparatus.

DETAILED DESCRIPTION OF THE PREFERRED EMBODIMENT

A preferred embodiment of the present invention will now be described in detail in accordance with the accompanying drawings.

Note that the present embodiment will be described on the precondition that the invention is applied to communication conforming to the IrDA standards for the sake of simplification of explanation. It will be apparent to persons skilled in the art that the present invention is widely applicable to wireless communication and cable communication.

Figure 1:
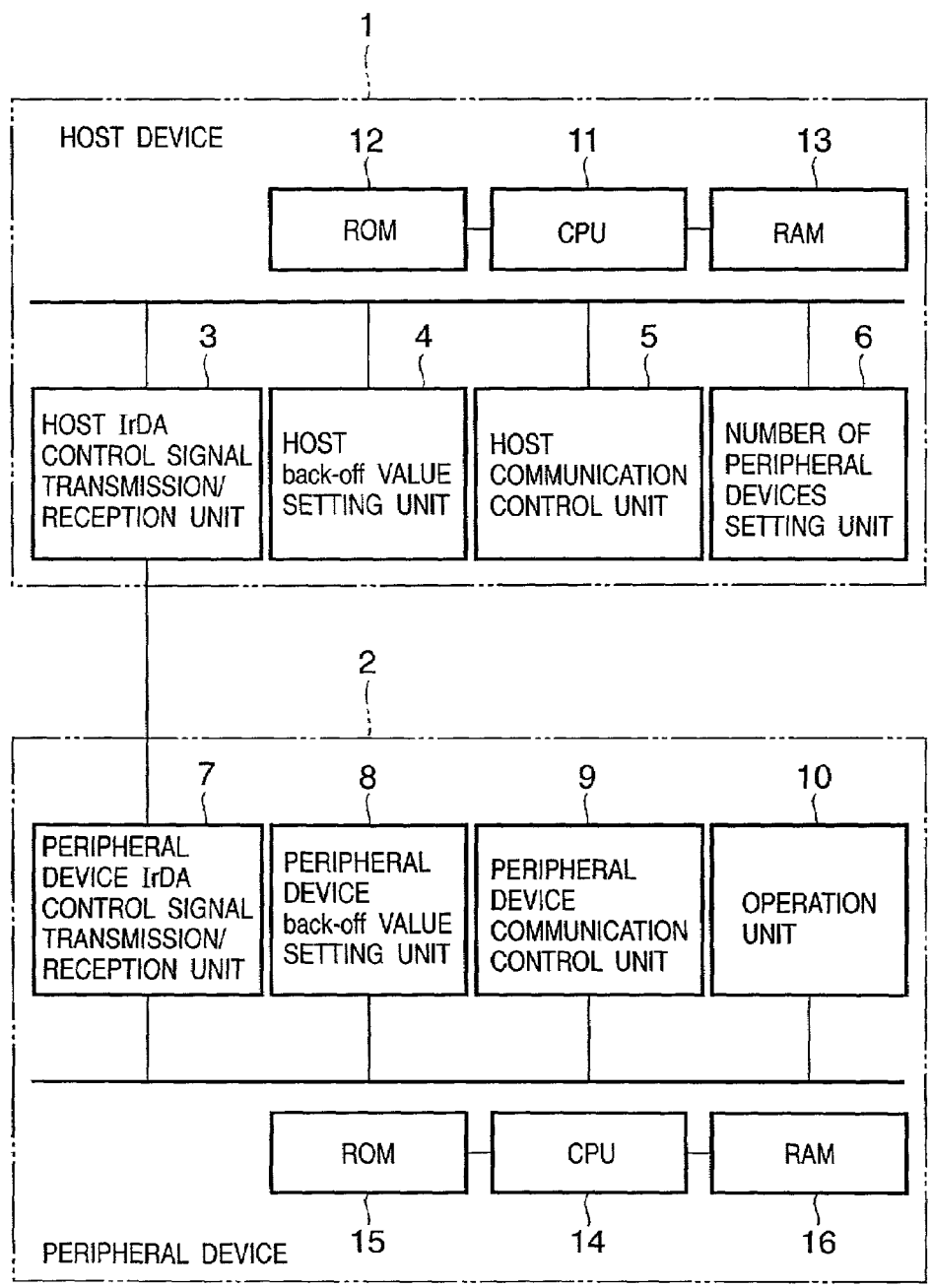
FIG. 1 is a functional block diagram showing the schematic construction of IrDA control apparatus to which the present invention is applied.

FIG. 1 is a functional block diagram showing the schematic construction of IrDA control apparatus to which the present invention is applied. As shown in FIG. 1, the IrDA control apparatus has at least a pair of host device 1 and peripheral device 2.

The host device 1 has a host IrDA control signal transmission/reception unit 3, a host back-off value setting unit 4, a host communication control unit 5, and a number of peripheral devices setting unit 6. The peripheral device 2 has a peripheral device IrDA control signal transmission/reception unit 7, a peripheral device back-off value setting unit 8, a peripheral device communication control unit 9, and an operation unit 10.

The host device 1 and the peripheral device 2 are connected with each other by IrDA control signals via the host IrDA control signal transmission/reception unit 3 and the peripheral device IrDA control signal transmission/reception unit 7. The host back-off value setting unit 4 sets a back-off value of the host device 1, and the peripheral device back-off value setting unit 7 sets a back-off value of the peripheral device 2.

A back-off value is reference information used for determining response command transmission timing. More particularly, in the respective host device and the peripheral device, one of values "0" to "7" can be set as a back-off value. If plural host devices exist within an IrDA control signal arrival range, different back-off values are set for the respective host devices, and if plural peripheral devices exist within the IrDA control signal arrival range, different back-off values are set for the respective peripheral devices. For example, if three host devices A, B and C, and three peripheral devices D, E and F exist, "0" is set in the host device A, "1" is set in the host device B, "2" is set in the host device C, "0" is set in the peripheral device D, "1" is set in the peripheral device E, and "2" is set in the peripheral device F. That is, within the IrDA control signal arrival range, the plural host devices never have the same back-off value. Similarly, within the IrDA control signal arrival range, the plural peripheral devices never have the same back-off value.

Next, an example of back-off value setting for each device will be described. The simplest method is setting a unique back-off value for each device by a manager's operating the operation unit of each device. Note that the back-off values may be stored in storage means such as a RAM, otherwise, may be held by ON-OFF of DIP switches.

Some conventional IrDA control apparatuses allow an operator to set an ID of host device or peripheral device. In the conventional apparatuses, the ID is used only as a Host ID or Peripheral ID. On the other hand, in the IrDA control apparatus of the present invention, a value set at the conventional ID setting unit can be used as a back-off value.

The host communication control unit 5 controls communication in the host device, and the peripheral device communication control unit 9 controls communication in the peripheral device. The number of peripheral devices setting unit 6 sets the number of peripheral devices to be operated. The operation unit 10 is operated by an operator so as to control the host device.

Upon setting the number of peripheral devices to be operated, the number of peripheral devices setting unit 6 sets the number of peripheral devices based on the content of operation at the operation unit 10 by the operator. The set value is held by storage means such a RAM.

Note that the host device 1 has a CPU 11, a ROM 12 and a RAM 13, and a part or all the various functions of the host device 1 are realized by execution of programs stored in the ROM 12 by the CPU 11. Further, the peripheral device 2 has a CPU 14, a ROM 15 and a RAM 16, and a part or all the various functions of the peripheral device 2 are realized by execution of programs stored in the ROM 15 by the CPU 14. The RAMs 13 and 16 are used as work areas or the like.

Next, the Enumeration procedure between the host device 1 and the peripheral device 2 will be described with reference to FIGS. 2 to 4.

A back-off value set in the host device 1 is used for calculation of waiting time until the transmission of the Enum-Hailing by the host device 1 in response to the Enum-Wakeup transmitted from the peripheral device 2. The command transmission is performed in the period of "back-off value×1 msec" as the waiting time.

Figure 2:
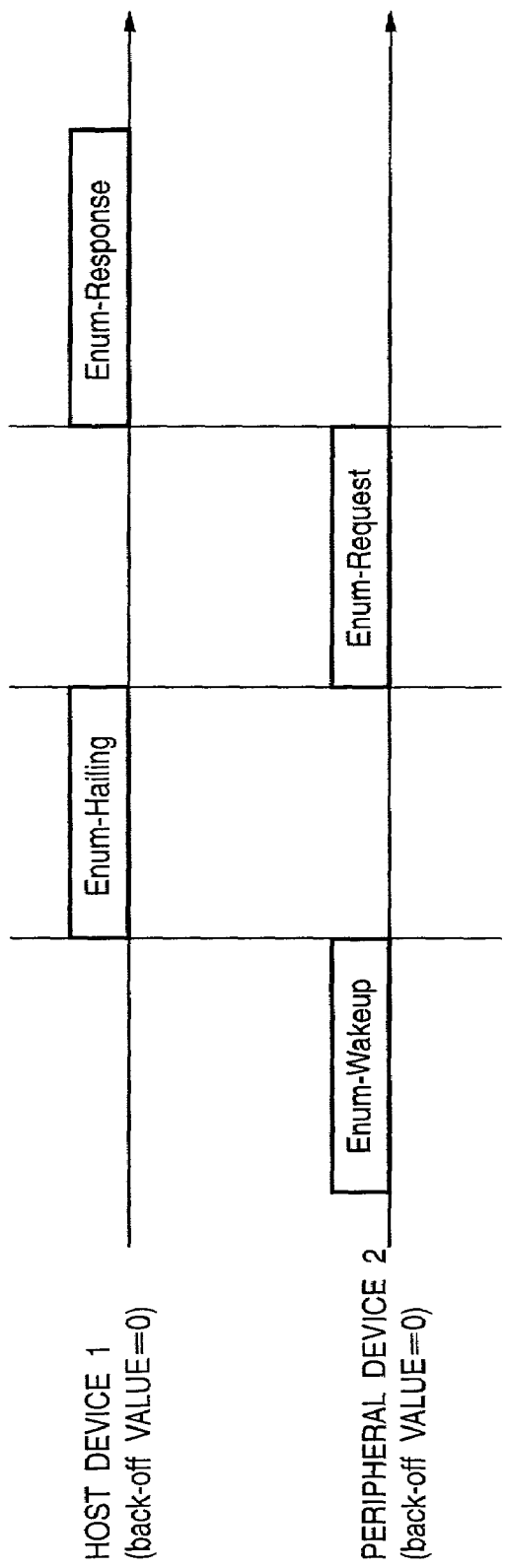
FIG. 2 is an timing chart showing an example of the Enumeration procedure by the IrDA control apparatus.
Figure 3:
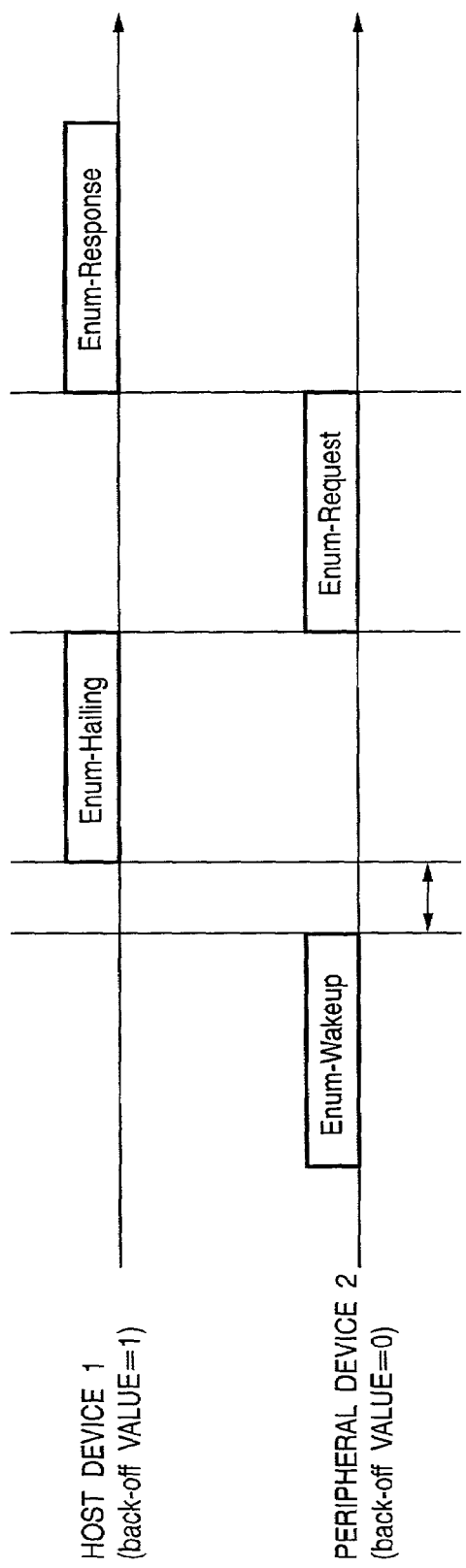
FIG. 3 is an timing chart showing another example of the Enumeration procedure by the IrDA control apparatus.
Figure 4:
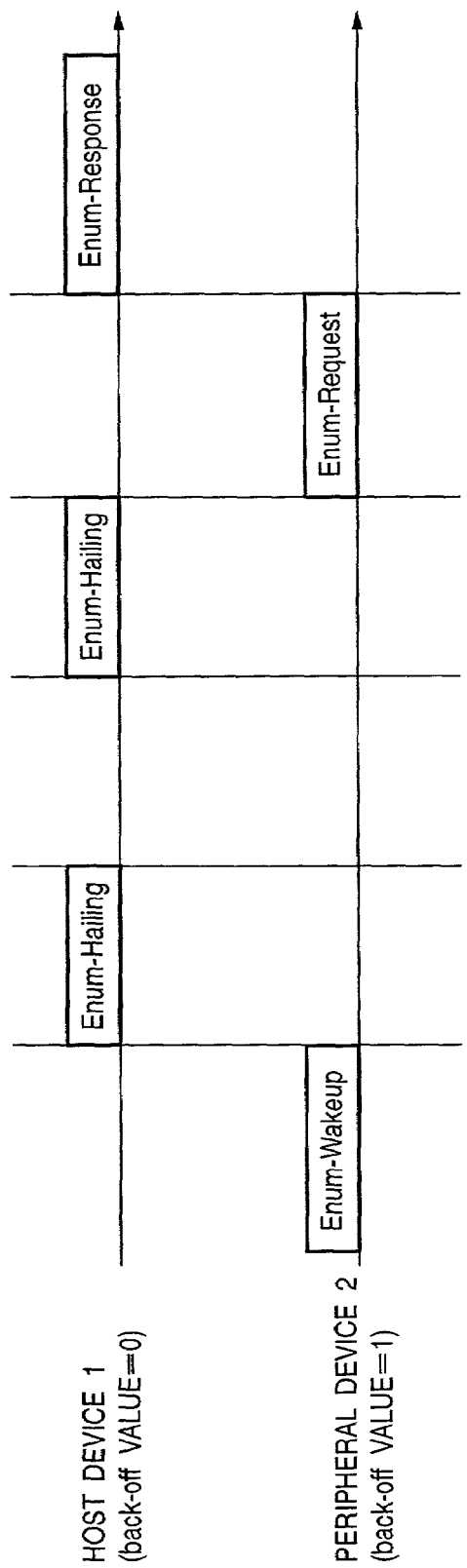
FIG. 4 is an timing chart showing another example of the Enumeration procedure by the IrDA control apparatus.

As shown in FIG. 2, the host device 1 where a back-off value is set to "0" immediately responds to the Enum-Wakeup transmitted from the peripheral device 2, and as shown in FIG. 3, the host device 1 where a back-off value is set to "1" responds to the Enum-Wakeup transmitted from the peripheral device 2 after 1 msec waiting time.

Further, in the case where plural host devices exist, if another host device starts Enumeration during the above waiting time, the set back-off value is also used for calculation of waiting time from the completion of Enumeration by the other host that started the Enumeration prior to the host device 1 to the transmission of Enum-Hailing by the host device 1.

Note that when the host IrDA control signal transmission/reception unit 3 receives the Enum-Hailing signal from the another host device, the host device determines that the other host has started Enumeration. Further, when the host IrDA control signal transmission/reception unit 3 receives the Enum-Response signal transmitted from another host device, the host device determines that one Enumeration procedure has been completed.

A back-off value set in the peripheral device 2 is used as a back-off value upon transmission of Enum-Request signal from the peripheral device 2 in response to the Enum-Hailing signal from the host device 1. At this time, the command frame is ignored by a number corresponding to the back-off value.

As shown in FIG. 2, the peripheral device 2 where a back-off value is set to "0" responds to the first command frame of the Enum-Hailing signal transmitted from the host device 1. As shown in FIG. 4, the peripheral device 2 where a back-off value is set to "1" ignores the first command frame of the Enum-Hailing transmitted from the host device 1, and responds to the second command frame.

Figure 5:
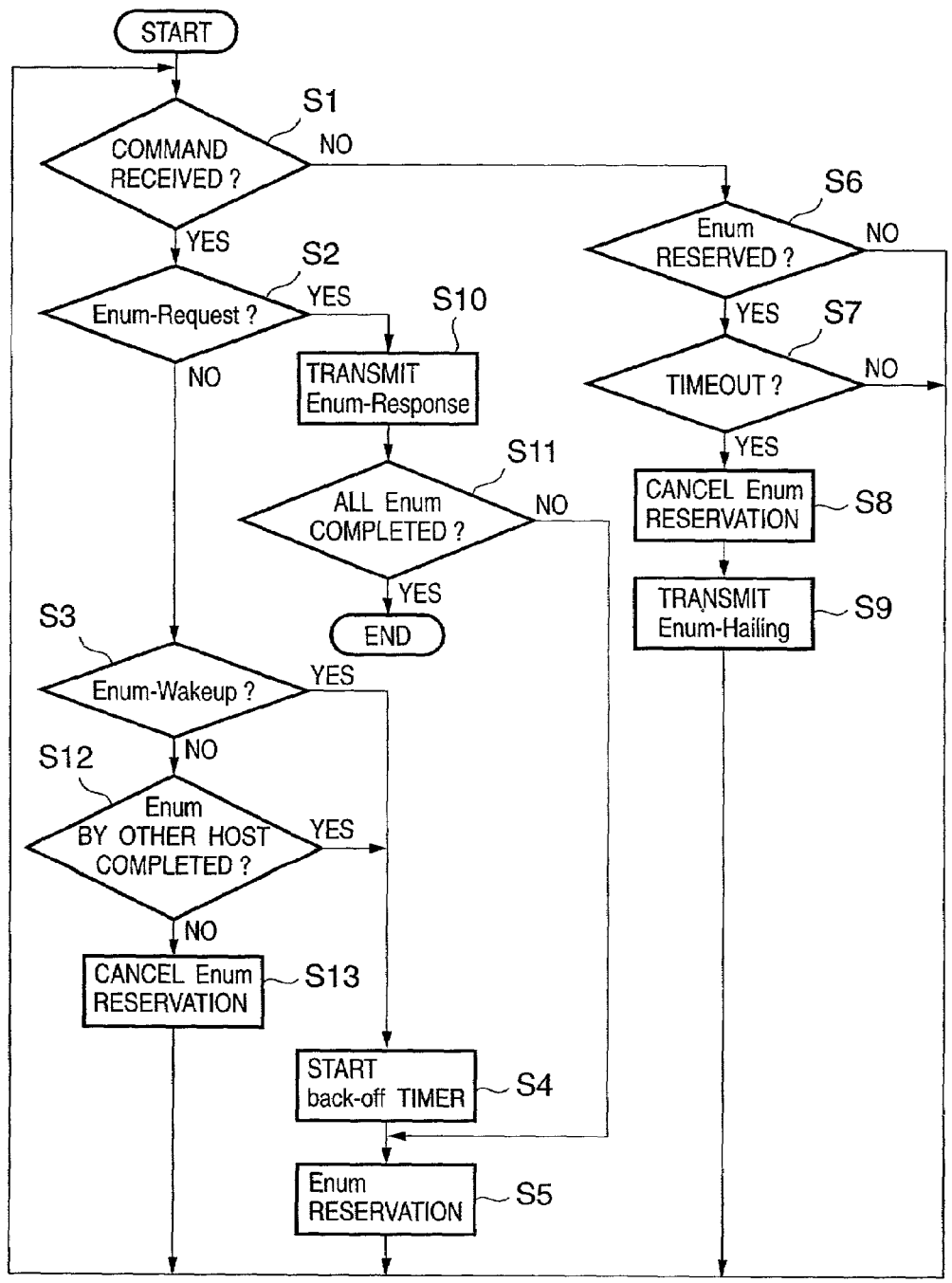
FIG. 5 is a flowchart showing an Enumeration operation of a host device.

Next, the Enumeration operation of the host device will be described with reference to the flowchart of FIG. 5. Note that the Enumeration operation is performed in the case where plural host devices and plural peripheral devices exist.

In the host device, the host IrDA control signal transmission/reception unit 3 receives a command (step S1), and if the received command is the Enum-Wakeup (steps S2 and S3), a back-off timer as a waiting time based on a back-off value set by the host back-off value setting unit 4 is started (step S4), and the device enters an Enumeration reserved status (step S5). In the Enumeration reserved status, if a command is not received (step S1) and the time designated by the back-off timer has elapsed (steps S6 and S7), the Enumeration reservation is cancelled (step S8), and the Enum-Hailing signal is transmitted (step S9).

After the transmission of the Enum-Hailing, if the Enum-Request transmitted to the host device is received (steps S1 and S2), the Enum-Response is transmitted (step S10), and the Enumeration with one peripheral device is completed.

After the transmission of the Enum-Response, if the Enumeration has been completed with all the peripheral devices, the number of which is set by the number of peripheral devices setting unit 6 (step S11), the Enumeration processing is terminated, otherwise, the device enters the Enumeration reserved status (step S5) so as to perform Enumeration with another peripheral device.

In the Enumeration reserved status, if a command indicating communication with another device is received before the time designated by the back-off timer elapse (steps S1 to S3 and S12), the Enumeration reservation is cancelled (step S13), and when the other host device has completed the Enumeration (steps S1 to S3 and S12), the back-off timer is started (step S4), and the device enters the Enumeration reserved status (step S5).

Figure 6:
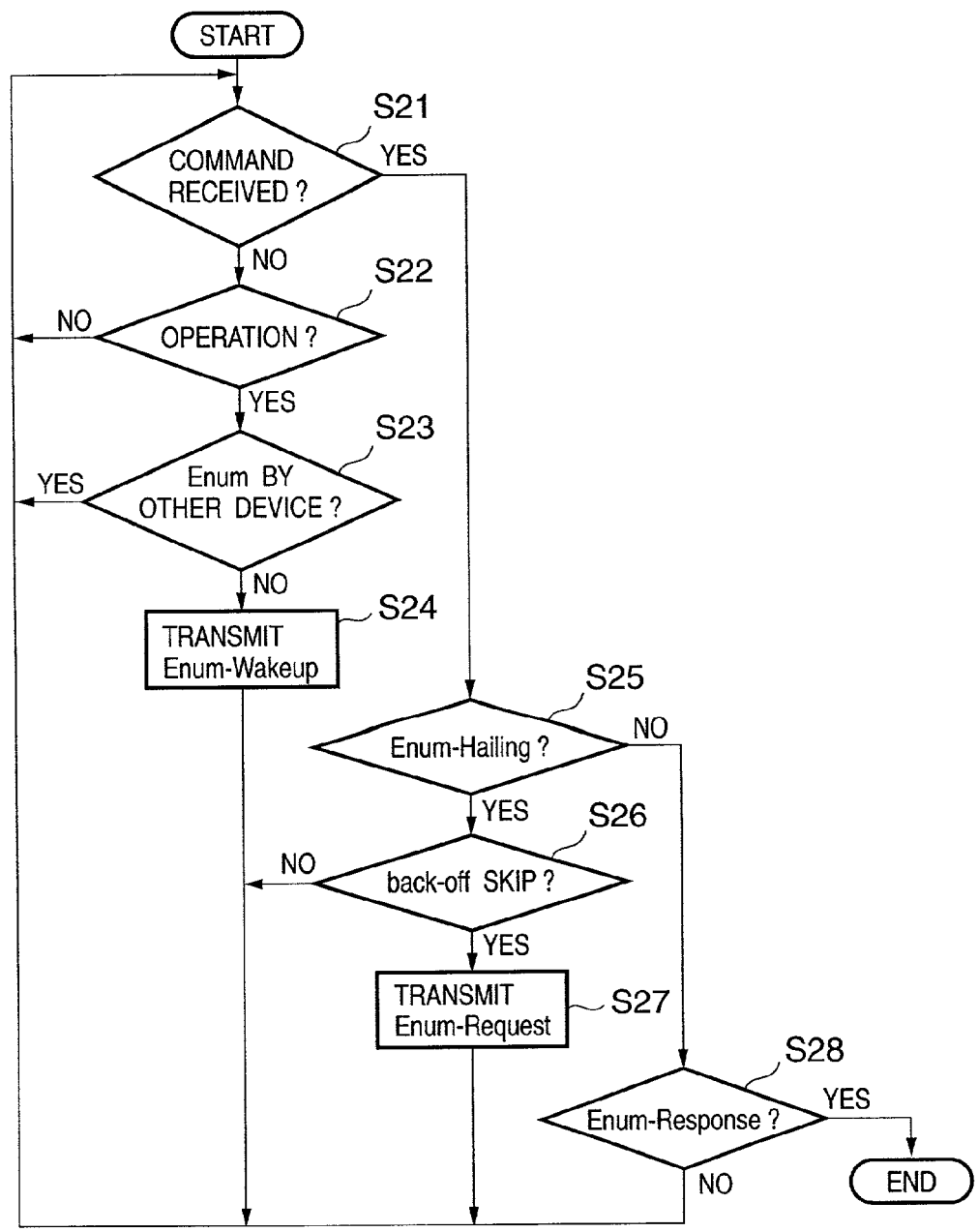
FIG. 6 is a flowchart showing an Enumeration operation of a peripheral device.

Next, the Enumeration operation of the peripheral device will be described with reference to the flowchart of FIG. 6. Note that the Enumeration operation is also performed in the case where plural host devices and plural peripheral devices exist.

The peripheral device is at first in a status waiting for command reception by the peripheral device IrDA control signal transmission/reception unit 7 or an operation by an operator at the operation unit 10 (steps S21 and S22).

When an operation has been made, if another peripheral device is not performing the Enumeration sequence (step S23), the Enum-Wakeup is transmitted (step S24), while if another device is performing the Enumeration sequence, the device returns to the command/operation waiting status (steps S21 and S22).

The determination as to whether or not another device is performing the Enumeration sequence can be made based on whether or not an Enumeration-related signal other than the Enum-Response signal has been received by the peripheral device IrDA control signal transmission/reception unit 7. That is, during a period between the detection of Enum-Request by the other peripheral device and the detection of Enum-Response by the host device in response to the Enum-Request, it can be determined that the other peripheral devices cease Enumeration. Otherwise, by utilizing the fact that the Enum-Wakeup meaning the start of Enumeration and The Enum-Response meaning the end of Enumeration are in pair, if the number of received Enum-Wakeup signals does not correspond with that of received Enum-Response signals, it may be determined that there is a device which is performing Enumeration.

In the command/operation waiting status (steps S21 and S22), if a command has been received, if the received command is the Enum-Hailing from a host device which has not completed Enumeration (step S25) and the Enum-Hailing is ignored by a number corresponding to the back-off value set by the peripheral device back-off value setting unit 8 (step S26), the Enum-Request is transmitted (step S27). If the Enum-Hailing is not ignored by the number corresponding to the back-off value (step S26), the device returns to the command/operation waiting status (steps S21 and S22).

Further, if the received command is the Enum-Response transmitted to the peripheral device 2 (step S28), the Enumeration processing is terminated, while if the command is not the Enum-Response transmitted to the peripheral device 2, the device returns to the command/operation waiting status (steps S21 and S22).

Next, the Bind procedure between the host device 1 and the peripheral device 2 will be described with reference to FIGS. 7 and 8.

A back-off value set in the peripheral device 2 is used as a back-off value upon transmission of the Bind-Request from the peripheral device 2 in response to the Bind-Hailing transmitted from the host device 1, and the command frame is ignored by a number corresponding to the back-off value.

Figure 7:
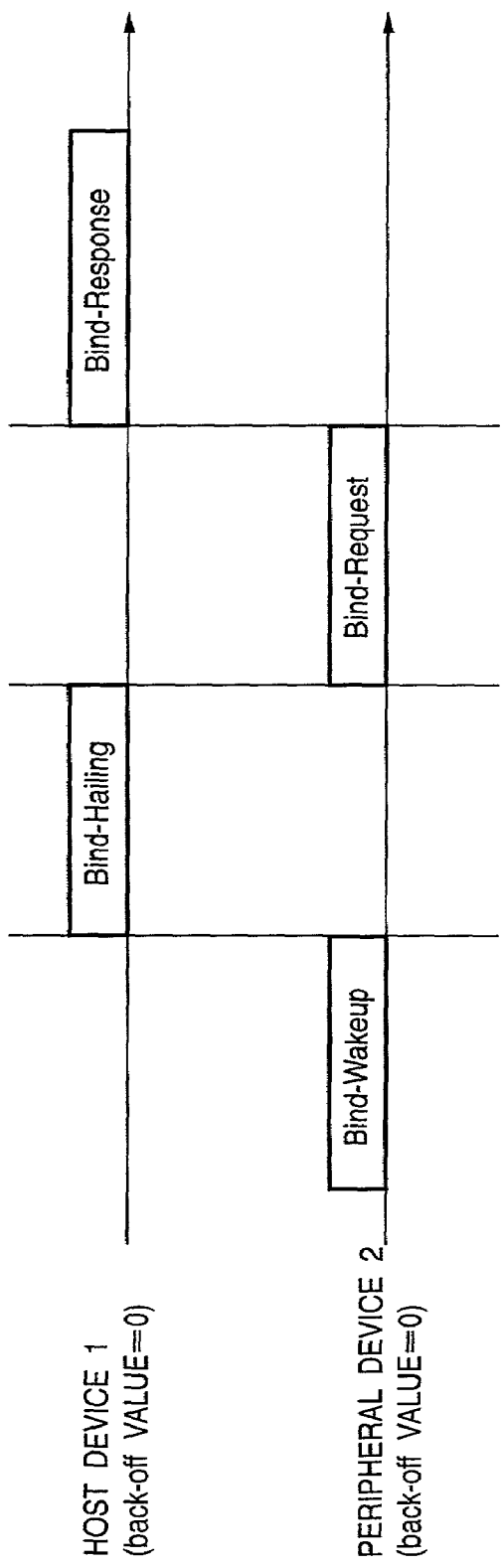
FIG. 7 is a timing chart showing an example of the Bind procedure by the IrDA control apparatus.
Figure 8:
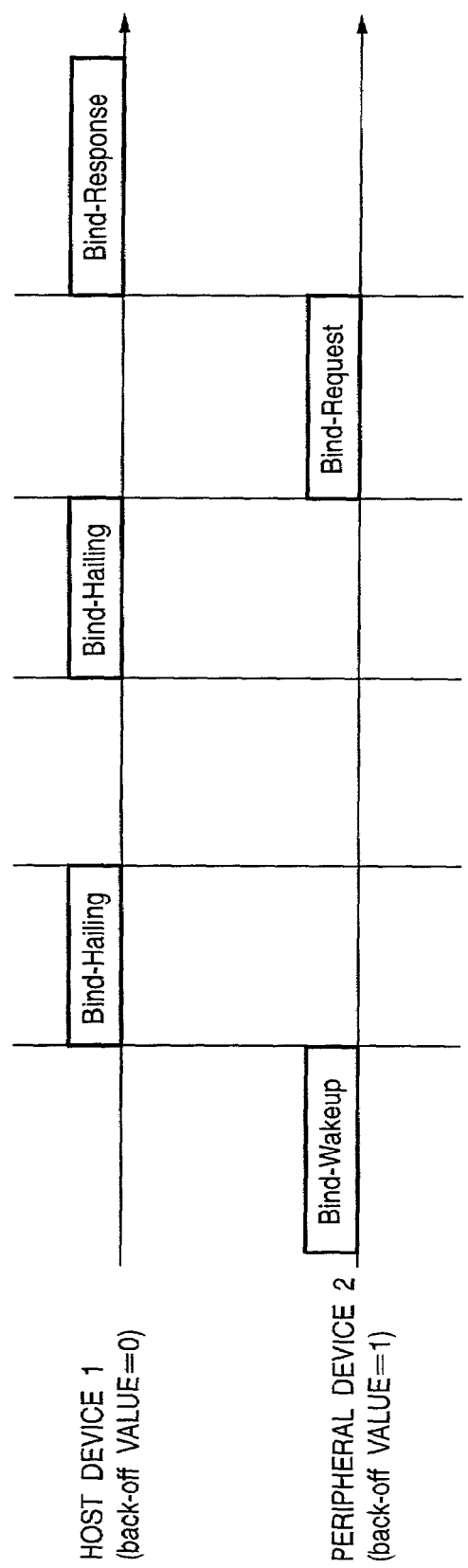
FIG. 8 is a timing chart showing another example of the Bind procedure by the IrDA control apparatus.

As shown in FIG. 7, the peripheral device 2 where a back-off value is set to "0" responds to the first command frame of the Bind-Hailing transmitted from the host device 1. As shown in FIG. 8, the peripheral device 2 where a back-off value is set to "1" ignores the first command frame but responds to the second command frame of the Bind-Hailing transmitted from the host device 1.

Figure 9:
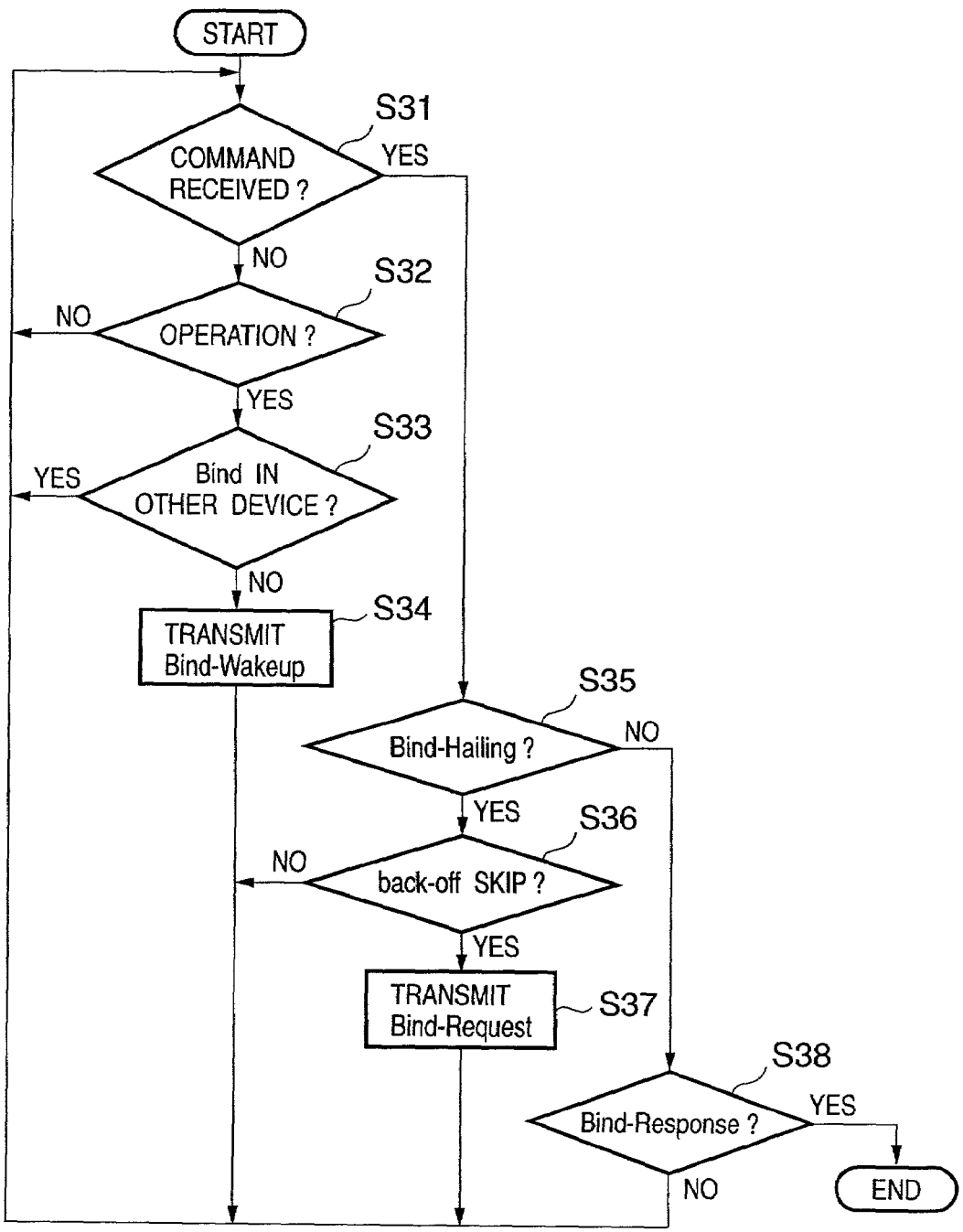
FIG. 9 is a flowchart showing a Bind operation of the peripheral device.

Next, the Bind operation of the peripheral device will be described with reference to the flowchart of FIG. 9. Note that in this example, the Bind operation is performed in an environment where plural host devices and plural peripheral devices exist.

The peripheral device is at first in a status waiting for command reception by the peripheral device IrDA control signal transmission/reception unit 7 or an operation by an operator at the operation unit 10 (steps S31 and S32).

In a status where the Enumeration has been completed, when an operation has been made, if another device is not performing the Bind sequence (step S33), the Bind-Wakeup is transmitted (step S34), while if another device is performing the Bind sequence, the device returns to the command/operation waiting status (steps S31 and S32).

When a command has been received, if the received command is the Bind-Hailing (step S35) and the Bind-Hailing is ignored by a number corresponding to the back-off value set by the peripheral device back-off setting unit 8 (step S36), the Bind-Request is transmitted (step S37), while if the Bind-Hailing is not ignored by the number corresponding to the back-off value (step S36), the device returns to the command/operation waiting status (steps S31 and S32).

Further, if the received command is the Bind-Response transmitted to the peripheral device 2 (step S38), the Bind processing is terminated, while if the received command is not the Bind-Response, the device returns to the command/operation waiting status (steps S31 and S32).

The determination as to whether or not the received command is the Bind-Response transmitted to the peripheral device 2 can be made based on whether or not the Bind-Response includes the identifier of the peripheral device 2. For example, if the peripheral device 2 transmits the Bind-Request including its own identifier, the host device obtains the identifier of the peripheral device 2, and the host device can transmit the Bind-Response including the identifier of the peripheral device 2.

Next, the Enumeration operation in the case where three host devices and three peripheral devices exist will be described with reference to FIGS. 10 and 11.

As shown in FIG. 10, the three host devices and the three peripheral devices can be connected by IrDA control signals.

First, "0" is set in the host device A, "1" is set in the host device B, and "2" is set in the host device C, by the back-off value setting unit 4, and "0" is set in the peripheral device D, "1" is set in the peripheral device E, and "2" is set in the peripheral device F, by the back-off value setting unit 8.

That is, waiting times before the transmission of Enum-Hailing in the respective host devices are T0=0 msec for the host device A, T1=1 msec for the host device B, and T2=2 msec for the host device C.

Next, the number of peripheral devices to be operated is set by the number of peripheral devices setting unit 6 in the respective host devices. That is, "3" is set in the host devices A, B and C.

Next, the Enumeration operation will be described with reference to the timing chart of FIG. 11.

Figure 11:
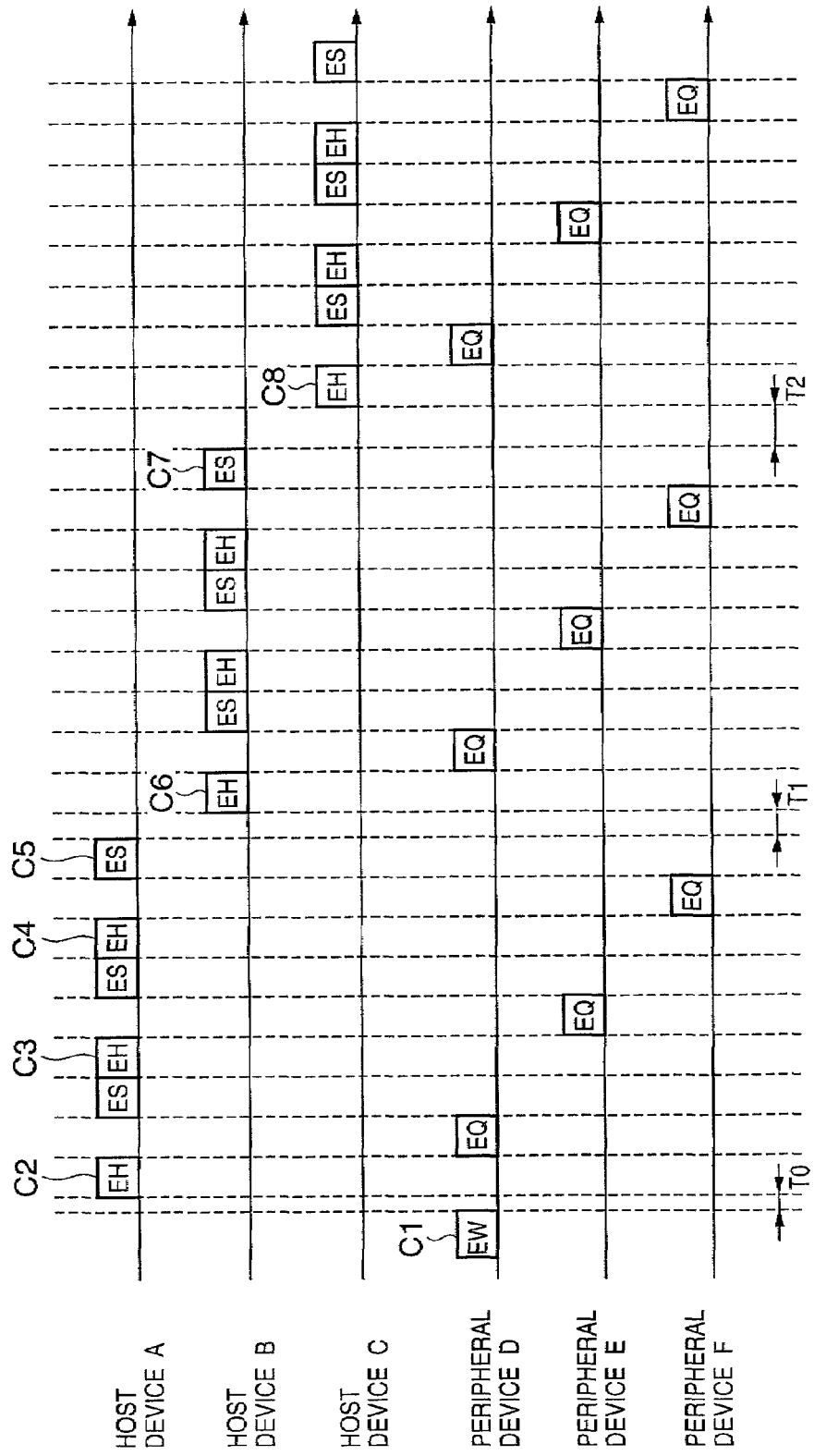
FIG. 11 is a timing chart showing an example of the Enumeration procedure in the case where three host devices and three peripheral devices exist.
Figure 12:
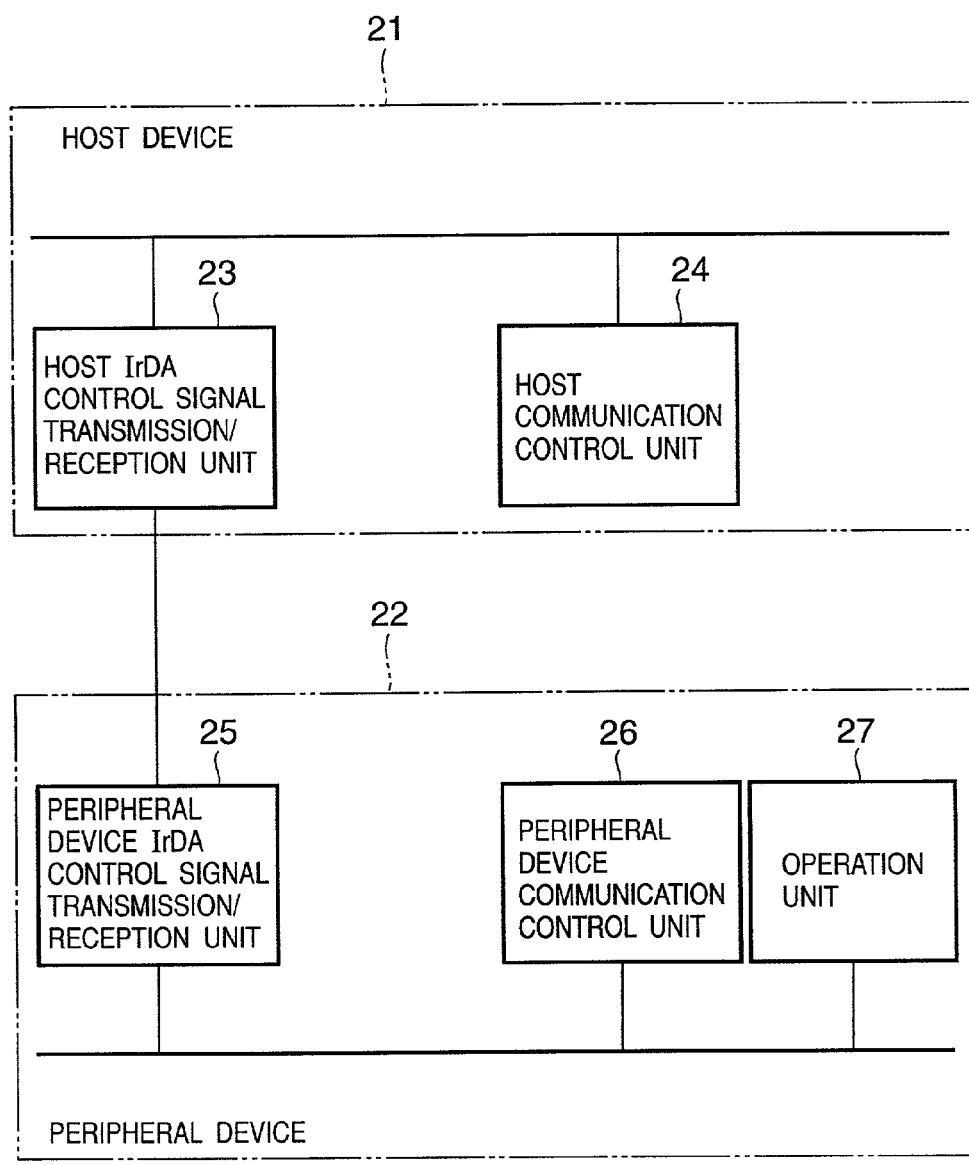
FIG. 12 is a timing chart showing another example of the Enumeration procedure by the conventional IrDA control apparatus.
Figure 13:
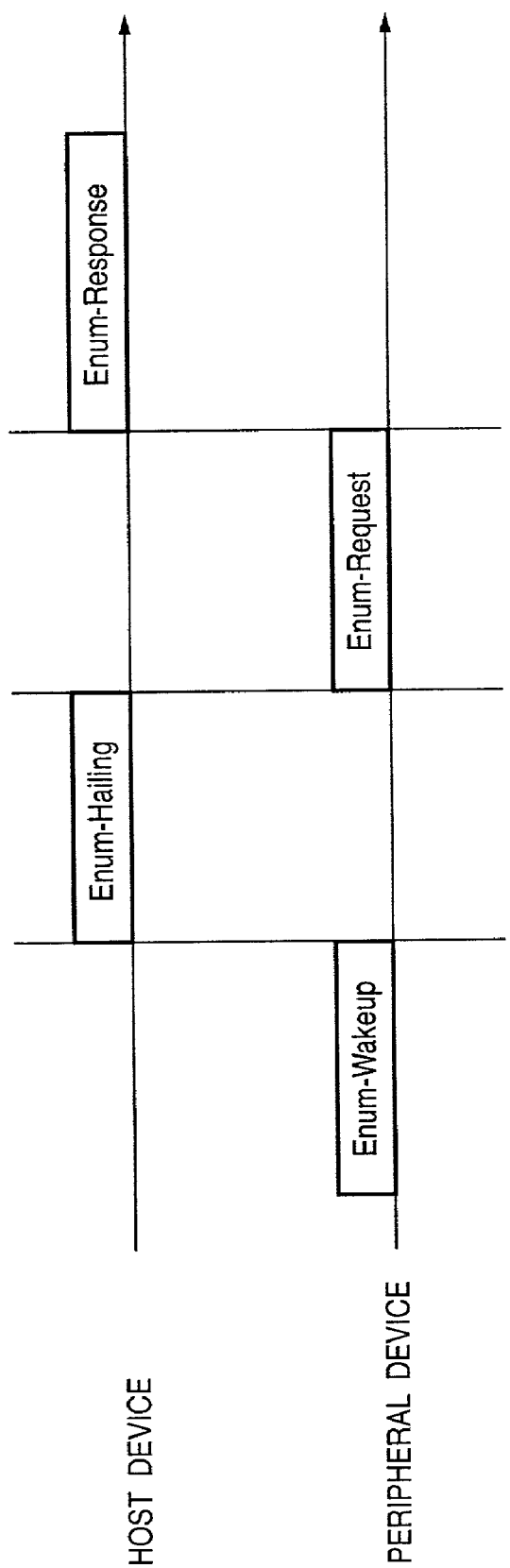
FIG. 13 is a timing chart showing another example of the Enumeration procedure by the conventional IrDA control apparatus.

In FIG. 11, symbol EW denotes the Enum-Wakeup; EH, the Enum-Hailing; EQ, the Enum-Request; and ES, the Enum-Response.

When the operator operates one of the peripheral devices by using the operation unit 10, the peripheral device transmits the Enum-Wakeup (command C1). In this example, the peripheral device D is operated, and the peripheral device D transmits the Enum-Wakeup, however, if the operator operates the peripheral device E or F, the peripheral device E or F similarly transmits the Enum-Wakeup.

The host devices receive the Enum-Wakeup (command C1), then, first, the host device A where the back-off value is set to "0" transmits the Enum-Hailing (command C2) in response to the Enum-Wakeup (command C1) after the elapse of waiting time T0.

At this time, as the host devices B and C do not transmit the Enum-Hailing during waiting times T1 and T2, command collision does not occur. Further, as the host device A starts Enumeration when the host devices B and C are in waiting status, the devices move to Enumeration reservation cancelled status without transmitting the Enum-Hailing.

The peripheral devices receive the Enum-Hailing (command C2), then, first, the peripheral device D where the back-off value is set to "0" transmits the Enum-Request. At this time, the peripheral devices E and F ignore the Enum-Hailing by the numbers of the back-off values. That is, the peripheral device E ignores the Enum-Hailing once, and the peripheral device F ignores the Enum-Hailing twice. Thus command collision does not occur.

The host device A receives the Enum-Request, and transmits the Enum-Response. Thus the Enumeration is completed between the host device A and the peripheral device D.

After the completion of the Enumeration with the peripheral device D, the host device A again transmits the Enum-Hailing (command C3) since Enumeration has not been completed with the peripheral devices the number of which is set by the number of peripheral devices setting unit 6. As it is the second time that the peripheral devices receives the Enum-Hailing, the peripheral device E where the back-off value is set to "1" transmits the Enum-Request in response to the Enum-Hailing.

The host device A receives the Enum-Request, and transmits the Enum-Response. Thus the Enumeration is completed between the host device A and the peripheral device E.

After the completion of the Enumeration with the peripheral device E, the host device A again transmits the Enum-Hailing (command C4) since Enumeration has not been completed with the peripheral devices set by the number of peripheral devices setting unit 6. As it is the third time that the peripheral devices receives the Enum-Hailing, the peripheral device F where the back-off value is set to "2" transmits the Enum-Request in response to the Enum-Hailing.

The host device A receives the Enum-Request, and transmits the Enum-Response (command C5). In this manner, the host device A completes the Enumeration with the three peripheral devices set by the number of peripheral devices setting unit 6, and terminates the Enumeration processing.

When the Enumeration between the host device A and the peripheral device F has been completed, the host devices B and C enter an Enumeration reserved status. After the elapse of the waiting time T1, the host device B transmits the Enum-Hailing (command C6).

At this time, as the host device C does not transmit the Enum-Hailing during the waiting time T2, the host device B starts Enumeration during the period, and the host device C moves to the Enumeration reservation cancelled status.

Thereafter, as in the case of the host device A, the Enumeration is performed between the host device B and the peripheral devices D, E and F.

When the host device B transmits the Enum-Response (command C7) and the Enumeration is completed, the host device C enters the Enumeration reserved status, and after the elapse of the waiting period T2, the host device C transmits the Enum-Hailing. Then, as in the case of the host devices A and B, Enumeration is performed between the host device C and the peripheral devices D, E and F.

By the above processing, Enumeration is completed between the three host devices A, B and C, and the three peripheral devices D, E and F, without occurrence of command collision.

Note that in the above embodiment, the waiting time until transmission of the Enum-Hailing by the host device is calculated by the expression "back-off value×1 msec", however, the expression may be replaced with another expression.

Further, the waiting time until the transmission of Enum-Hailing by the host device may not be fixed time but may be "(back-off value—the number of Enumeration-completed host devices)×1 msec". In this case, if plural host devices exist, the waiting time after the completion of Enumeration by one host device before the start of Enumeration by another host device can be reduced.

The present invention can be applied to a system constituted by a plurality of devices, or to an apparatus comprising a single device. Furthermore, the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A communication system comprising one or more host apparatus and one or more peripheral apparatus,
    wherein said host apparatus comprises:
    a host back-off value setting device configured to set a back-off value of said host apparatus;
    a host determination device configured to determine a timing for transmission of a response command to a command received from said peripheral apparatus, based on the back-off value set by said host back-off value setting device;
    a host discrimination device configured to discriminate whether other host apparatuses are currently conducting a predetermined procedure; and
    a host inhibition device configured to inhibit transmission of said response command in accordance with a discrimination by said host discrimination device until the predetermined procedure between the other host apparatuses is completed,
    and wherein said peripheral apparatus comprises:
    a peripheral back-off value setting device configured to set a back-off value of said peripheral apparatus;
    a peripheral determination device configured to determine a timing for transmission of a response command to a command received from said host apparatus, based on the back-off value set by said peripheral back-off value setting device;
    a peripheral discrimination device configured to discriminate whether another apparatus is currently conducting a predetermined procedure; and
    a peripheral inhibition device configured to inhibit transmission of said response command in accordance with a discrimination by said peripheral discrimination device.

2. The communication system according to claim 1, further comprising a control device configured to control infrared bidirectional communication performed between plural host apparatuses and plural peripheral apparatuses.

3. The communication system according to claim 1, wherein the communication system is an infrared bidirectional communication system, and said host discrimination device and said peripheral discrimination device discriminate whether a registration procedure is currently being conducted between the host apparatus and the peripheral apparatus.

4. The communication system according to claim 1, wherein the communication system is an infrared bidirectional communication system, and said host discrimination device and said peripheral discrimination device discriminate whether an Enumeration procedure is currently being conducted between the host apparatus and the peripheral apparatus, and discriminate whether another apparatus is currently conducting Bind processing.

5. The communication system according to claim 1, wherein the back-off value of said host apparatus is set through a non-random process.

6. The communication system according to claim 1, wherein the back-off value of said peripheral apparatus is set through a non-random process.

7. A control method for controlling communication performed between a host apparatus and a peripheral apparatus, wherein on the host apparatus side, said method comprises:
a host back-off value setting step of setting a back-off value of said host apparatus;
a host determination step of determining a timing for transmission of a response command to a command received from said peripheral apparatus, based on the back-off value set at said host back-off value setting step;
a host discrimination step of discriminating whether other host apparatuses are currently conducting a predetermined procedure; and
a host inhibition step of inhibiting transmission of said response command in accordance with a discrimination by said host discrimination step until the predetermined procedure between the other host apparatuses is completed,
and wherein on the peripheral apparatus side, said method comprises:
a peripheral back-off value setting step of setting a back-off value of said peripheral apparatus;
a determination step of determining a timing for transmission of a response command to a command received from said host apparatus, based on the back-off value set at said peripheral apparatus back-off value setting step;
a peripheral discrimination step of discriminating whether another apparatus is currently conducting a predetermined procedure; and
a peripheral inhibition step of inhibiting transmission of said response command in accordance with a discrimination by said peripheral discrimination step.

8. The method according to claim 7, wherein the back-off value of said host apparatus is set by a non-random process.

9. The method according to claim 7, wherein the back-off value of said peripheral apparatus is set by a non-random process.

10. A host apparatus for performing communication with one or more peripheral apparatuses comprising:
a setting device configured to set reference information different from that of another host apparatus positioned around said host apparatus;
a discrimination device configured to discriminate whether other host apparatuses are currently conducting a predetermined procedure;
a control device configured to inhibit transmission of a command in accordance with a discrimination by said discrimination device until the predetermined procedure between the other host apparatuses is completed; and
a transmission device configured to transmit the command at a timing based on the reference information set by said setting device after the inhibition is cancelled by said control device.

11. The host apparatus according to claim 10, wherein the communication is performed with at least one peripheral apparatus.

12. The host apparatus according to claim 10, wherein said discrimination device discriminates whether a registration procedure is currently being conducted between the another host apparatus and the peripheral apparatus.

13. The host apparatus according to claim 10, wherein the reference information of said host apparatus is set through a non-random process.

14. A peripheral apparatus for performing communication with one or more host apparatuses comprising:
a setting device configured to set reference information different from that of another peripheral apparatus positioned around said peripheral apparatus;
a discrimination device configured to discriminate whether other apparatuses are currently conducting a predetermined procedure;
a control device configured to inhibit transmission of a command in accordance with a discrimination by said discrimination device until the predetermined procedure between the other apparatuses is completed; and
a transmission device configured to transmit the command at a timing based on the reference information set by said setting device after the inhibition is cancelled by said control device.

15. The peripheral apparatus according to claim 14, wherein the predetermined procedure is Enumeration processing.

16. The peripheral apparatus according to claim 14, wherein said control device inhibits the transmission of the command if another apparatus is currently performing a series of Bind processing.

17. The peripheral apparatus according to claim 14, wherein the reference information of said peripheral apparatus is set through a non-random process.

18. A host apparatus for controlling communication with a peripheral apparatus, comprising:
a host back-off value setting device configured to set a back-off value of said host apparatus;
a discrimination device configured to discriminate whether other host apparatuses are currently conducting a predetermined procedure;
an inhibition device configured to inhibit transmission of a command in accordance with a discrimination by said discrimination device until the predetermined procedure between the other host apparatuses is completed; and
a determination device configured to determine a timing for transmission of the command based on the back-off value set by said host back-off value setting device, the timing for the transmission being at least after the inhibition is cancelled by the inhibition device.

19. The host apparatus according to claim 18, wherein said discrimination device discriminates whether a registration procedure is currently being conducted between the host apparatus and the peripheral apparatus.

20. The host apparatus according to claim 18, wherein the back-off value is set through a non-random process.

21. A peripheral apparatus for performing communication with a host apparatus, comprising:
   a peripheral back-off value setting device configured to set a back-off value of said peripheral apparatus;
   a discrimination device configured to discriminate whether other apparatuses are currently conducting predetermined procedure;
   an inhibition device configured to inhibit transmission of a command in accordance with a discrimination by said discrimination device until the predetermined procedure between the other apparatuses is completed; and
   a determination device configured to determine a timing for transmission of the command, the timing for the transmission being at least after the inhibition is cancelled by the inhibition device.

22. The peripheral apparatus according to claim 21, wherein said discrimination device discriminates whether a registration procedure is currently being conducted between the host apparatus and the peripheral apparatus.

23. The peripheral apparatus according to claim 21, wherein the back-off value is set through a non-random process.

24. A computer-readable medium storing a computer program for a host apparatus for controlling communication with a peripheral apparatus, the program comprising:
   setting a back-off value of said host apparatus;
   discriminating whether other host apparatuses are currently conducting a predetermined procedure;
   inhibiting transmission of a command in accordance with a discrimination of the discriminating step until the predetermined procedure between the other host apparatuses is completed; and
   determining timing for transmission of the command based on the back-off value set at said host back-off value setting, the timing for the transmission being at least after the inhibition is cancelled by the inhibiting step.

25. The computer-readable medium according to claim 24, wherein the back-off value is set through a non-random process.

26. A computer-readable medium storing a computer program for a peripheral apparatus for performing communication with a host apparatus, the program comprising the steps of:
   setting a back-off value of said peripheral apparatus;
   discriminating whether other apparatuses are currently conducting a predetermined procedure;
   inhibiting transmission of a command in accordance with a discrimination of the discriminating step until the predetermined procedure between the other apparatuses is completed; and
   determining a timing for transmission of a command based on the back-off value set at said back-off value setting, the timing for the transmission being at least after the inhibition is cancelled by the inhibiting step.

27. The computer-readable medium according to claim 26, wherein the back-off value is set through a non-random process.

* * * * *